US011269896B2

(12) United States Patent
Wang et al.

(10) Patent No.: US 11,269,896 B2
(45) Date of Patent: Mar. 8, 2022

(54) SYSTEM AND METHOD FOR AUTOMATIC DIFFICULTY LEVEL ESTIMATION

(71) Applicant: FUJITSU LIMITED, Kawasaki (JP)

(72) Inventors: Jun Wang, San Jose, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 216 days.

(21) Appl. No.: 16/566,766

(22) Filed: Sep. 10, 2019

(65) Prior Publication Data
US 2021/0073237 A1 Mar. 11, 2021

(51) Int. Cl.
G06F 16/2457 (2019.01)
G06K 9/00 (2022.01)

(52) U.S. Cl.
CPC .. G06F 16/24578 (2019.01); G06F 16/24573 (2019.01); G06F 16/24575 (2019.01); G06K 9/00463 (2013.01); G06K 9/00469 (2013.01)

(58) Field of Classification Search
CPC ........ G06F 16/24578; G06F 16/24573; G06F 16/24575; G06K 9/00469; G06K 9/00463
See application file for complete search history.

(56) References Cited

U.S. PATENT DOCUMENTS

| 5,832,472 | A | * | 11/1998 | Sheppard, II | ........... | G06F 16/38 707/741 |
| 9,489,377 | B1 | | 11/2016 | Feller et al. | | |
| 9,711,064 | B2 | | 7/2017 | Nielson et al. | | |
| 9,928,415 | B2 | | 3/2018 | Wang et al. | | |
| 2005/0267685 | A1 | * | 12/2005 | Intriligator | .............. | G01W 1/10 702/3 |
| 2006/0241949 | A1 | * | 10/2006 | Tobias | ................... | G06Q 40/00 345/440 |
| 2006/0242630 | A1 | * | 10/2006 | Koike | ..................... | G06F 40/56 717/136 |
| 2012/0015053 | A1 | | 1/2012 | Schmitz et al. | | |
| 2012/0150534 | A1 | | 6/2012 | Sheehan et al. | | |

(Continued)

OTHER PUBLICATIONS

Xia et al. "Text Readability Assessment for Second Language Learners" Proceedings of the 11th Workshop on Innovative Use of NLP for Building Educational Applications (BEA 2016). San Diego, California, USA; Jun. 16, 2016.

(Continued)

Primary Examiner — Etienne P Leroux
(74) Attorney, Agent, or Firm — Maschoff Brennan

(57) ABSTRACT

A method of automatically estimating the difficulty level of online content. The method includes receiving, by one or more processors, electronic content which is accessible via an online network and which is at least temporarily stored in at least one non-transitory storage media, extracting, by the one or more processors, structural and non-linguistic information from the electronic content. The method further includes extracting, by the one or more processors, linguistic information from the electronic content. The method further includes generating, by the one or more processors, a difficulty estimation for the content based on the structural and non-linguistic information in addition to the linguistic information. The method further includes generating, by the one or more processors, a recommendation of a subset of the electronic content to a user based on the difficulty estimation.

18 Claims, 17 Drawing Sheets

(56) References Cited

U.S. PATENT DOCUMENTS

| | | | |
|---|---|---|---|
| 2013/0066876 A1* | 3/2013 | Raskino | G06F 16/24575 |
| | | | 707/741 |
| 2016/0035827 A1 | 2/2016 | Diaz et al. | |
| 2016/0063596 A1 | 3/2016 | Landau et al. | |
| 2016/0358275 A1 | 12/2016 | Ikawa et al. | |
| 2017/0011642 A1 | 1/2017 | Wang et al. | |
| 2018/0004726 A1 | 1/2018 | Liu et al. | |
| 2018/0046628 A1 | 2/2018 | Wang et al. | |
| 2018/0096623 A1* | 4/2018 | Xia | G09B 11/00 |
| 2020/0034764 A1* | 1/2020 | Panuganty | G06F 40/284 |

OTHER PUBLICATIONS

Pilán et al. "A Readable Read: Automatic Assessment of Language Learning Materials based on Linguistic Complexity" International Journal of Computational Linguistics and Applications (IJLCA), Volume: vol. 6 No. 2, Apr. 2015.

Heilman et al. "An Analysis of Statistical Models and Feature s for Reading Difficulty Prediction" Third ACL Workshop on Innovative Use of NLP for Building Educational Applications, pp. 71-79, Columbus, Ohio, USA, Jun. 2008.

Petersen et al. "A machine learning approach to reading level assessment" University of Washington CSE Technical Report; Jun. 15, 2006.

Han et al. "Understanding the Difficulty Factors for Learning Materials: A Qualitative Study" AIED Jul. 2013.

Newsela; Instructional Content Platform; Newsela.com; retrieved Aug. 12, 2019.

Vilnis et al. "Word Representations via Gaussian Embedding" ICLR 2015.

Lin et al. "A Mathematics Retrieval System for Formulae in Layout Presentations" SIGIR (2014).

\* cited by examiner

As new data are observed, the posterior in Eq. 18 is automatically adjusted and can eventually be analysed for its statistics. However, often the normalisation integral in Eq. 19 is the intricate part of Bayesian estimation which will be treated further below.

In the prediction problem, the Bayesian approach extends MAP by ensuring an exact equality in Eq. 14, which then becomes:

$$p(\bar{x}|X) = \int_{\theta \in \Theta} p(\bar{x}|\theta) \, p(\theta|X) \, d\theta \quad (20)$$

$$= \int_{\theta \in \Theta} p(\bar{x}|\theta) \, \frac{p(X|\theta) p(\theta)}{p(X)} \, d\theta \quad (21)$$

Here the posterior $p(\theta|X)$ replaces an explicit calculation of parameter values $\theta$. By integration over $\theta$, the prior belief is automatically incorporated into the prediction, which itself is a distribution over $\bar{x}$ and can again be analysed w.r.t. confidence, e.g., via its variance.

As an example, we build a Bayesian estimator for the above situation of having $N$ Bernoulli observations (5, 5), as in the MAP example. In addition to the new-random parameter with parameters $(5,5)$, as in the MAP example. In addition to the maximum a posteriori value, we want the expected value of the new-random parameter $p$ and a measure of estimation confidence. Including the prior belief, we obtain[7]:

$$p(p|C, \alpha, \beta) = \frac{\prod_{i=1}^{N} p(C=c_i|p) \, p(p|\alpha, \beta)}{\int_0^1 \prod_{i=1}^{N} p(C=c_i|p) \, p(p|\alpha, \beta) \, dp} \quad (22)$$

$$= \frac{p^{A(p)}(1-p)^{B(p)} \frac{1}{B(\alpha,\beta)} p^{\alpha-1}(1-p)^{\beta-1}}{Z} \quad (23)$$

```
p\left(\overline{x}|X\
right)=\int_{\theta\in
\Theta} p\left(
\overline{x}|X\right)p
\left(\theta|X\right)
d\theta
```

```
<math xmlns="http://www.w3.org/199
  <mi> p </mi>
  <mfenced>
    <mrow>
      <mover>
        <mrow>
          <mi> x </mi>
        </mrow>
        <mo> - </mo>
      </mover>
      <mrow>
        <mo> / </mo>
        <mi> X </mi>
      </mrow>
    </mrow>
  </mfenced>
  <mo> = </mo>
```

| Category label | #train | #test | Avg(d) | $|\mathcal{B}^L|/|\mathcal{B}^U|$ |
|---|---|---|---|---|
| alt.atheism | 480 | 319 | 157.20 | 1/3 |
| comp.graphics | 584 | 389 | 135.68 | 2/5 |
| comp.os.ms-windows.misc | 591 | 394 | 226.08 | 4/8 |
| comp.sys.ibm.pc.hardware | 590 | 392 | 95.10 | 5/7 |
| comp.sys.mac.hardware | 578 | 385 | 88.98 | 4/5 |
| comp.windows.x | 593 | 395 | 140.81 | 3/5 |
| misc.forsale | 585 | 390 | 77.27 | 0/8 |
| rec.autos | 594 | 396 | 103.10 | 1/7 |
| rec.motorcycles | 598 | 398 | 95.41 | 8/3 |
| rec.sport.baseball | 597 | 397 | 113.07 | 2/3 |

*1510*

| Category label | #train | #test | Avg(d) | $|\mathcal{B}^L|/|\mathcal{B}^U|$ |
|---|---|---|---|---|
| acq | 1,485 | 690 | 68.13 | 1/9 |
| coffee | 90 | 21 | 100.54 | 1/4 |
| crude | 225 | 98 | 118.10 | 1/9 |
| corn | 2,037 | 1,040 | 57.97 | 1/7 |
| gold | 70 | 20 | 78.86 | 1/4 |
| interest | 140 | 67 | 78.86 | 1/8 |
| money-fx | 178 | 69 | 89.23 | 1/8 |
| ship | 107 | 35 | 89.70 | 2/9 |
| sugar | 90 | 24 | 77.04 | 1/8 |
| trade | 225 | 73 | 104.08 | 1/2 |
| | | | 180.02 | 1/7 |

*1515*

| Datasets | Classification task | STM | | GE-FL | | DescLDA | | SNB-EM | | TLC++ | sLDA | SVM |
|---|---|---|---|---|---|---|---|---|---|---|---|---|
| | | $\mathcal{B}^L$ | $\mathcal{B}^L \cup \mathcal{B}^U$ | $\mathcal{B}^L$ | $\mathcal{B}^L \cup \mathcal{B}^U$ | $\mathcal{B}^L$ | $\mathcal{B}^L \cup \mathcal{B}^U$ | $\mathcal{B}^L$ | $\mathcal{B}^L \cup \mathcal{B}^U$ | | | |
| 20NG | med-space | 0.964 | 0.966 | 0.712† | 0.935† | 0.877† | 0.977 | 0.897 | 0.967 | 0.933† | 0.910† | 0.970 |
| | pc-mac | 0.888† | 0.843 | 0.491† | 0.705† | 0.688† | 0.893† | 0.895 | 0.876 | 0.685† | 0.723† | 0.925 |
| | politics-religion | 0.907† | 0.952 | 0.688† | 0.888† | 0.888† | 0.900† | 0.894 | 0.939 | 0.911† | 0.925† | 0.954 |
| | politics-sci | 0.900 | 0.962 | 0.778† | 0.888† | 0.822† | 0.912† | 0.886 | 0.941 | 0.908† | 0.930† | 0.971 |
| | comp-religion-sci | 0.918 | 0.927 | 0.720† | 0.828† | 0.669† | 0.498† | 0.907 | 0.919 | 0.817† | 0.909† | 0.936 |
| | politics-rec-religion-sci | 0.916† | 0.941 | 0.719† | 0.827† | 0.514† | 0.282† | 0.798 | 0.917 | 0.844† | 0.828† | 0.941 |
| | autos-motorcycles-baseball-hockey | 0.916† | 0.977 | 0.849† | 0.672† | 0.531† | 0.713† | 0.715 | 0.938 | 0.734† | 0.884† | 0.957 |
| | All 20 categories | 0.662† | 0.822 | 0.520† | 0.550† | 0.632† | 0.688† | 0.401 | 0.676 | 0.510† | 0.623† | 0.820 |
| Reuters-10 | All 10 categories | 0.694† | 0.822 | 0.667† | 0.770† | 0.317† | 0.803† | 0.529 | 0.725 | 0.569† | 0.753† | 0.932 |

*FIG. 15*

SYSTEM AND METHOD FOR AUTOMATIC DIFFICULTY LEVEL ESTIMATION

FIELD

The embodiments discussed in the present disclosure are related to systems and methods for automatically estimating a difficulty level of documents.

BACKGROUND

With the increased usage of the internet, there has been an increase in the amount of technological information that is available online. This technical content spans a wide variety of topics in various areas and areas and across a variety of different types of content, such as blogs, wikis, articles, and papers. In addition, the various types of technological content also corresponds with different difficulty levels of technicality. For example, for a single topic, there may be a variety of information available which is designed as introductory for general readers who may have little to know prior knowledge about the corresponding technology, another set of information available which is designed as medium-level for readers with more sophistication and understanding than a beginner, and even another set of information for readers or experts who have an advanced level of understanding about the technology. One problem with the vast amount of information of varying degrees of technicality or difficulty is that it may be difficult to efficiently perform searches and recommendations to users based on their own personal level of expertise.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method of automatically estimating the difficulty level of online content. The method includes receiving, by one or more processors, electronic content which is accessible via an online network and which is at least temporarily stored in non-transitory storage media, extracting, by the one or more processors, structural and non-linguistic information from the electronic content. The method further includes extracting, by the one or more processors, linguistic information from the electronic content. The method further includes generating, by the one or more processors, a difficulty estimation for the content based on the structural and non-linguistic information in addition to the linguistic information. The method further includes generating, by the one or more processors, a recommendation of a subset of the electronic content to a user based on the difficulty estimation.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 9 is an example of an equation which may be converted and analyzed according to one embodiment;

FIG. 15 is an example of a table which may be analyzed according to one embodiment;

DESCRIPTION OF EMBODIMENTS

Figure 1:
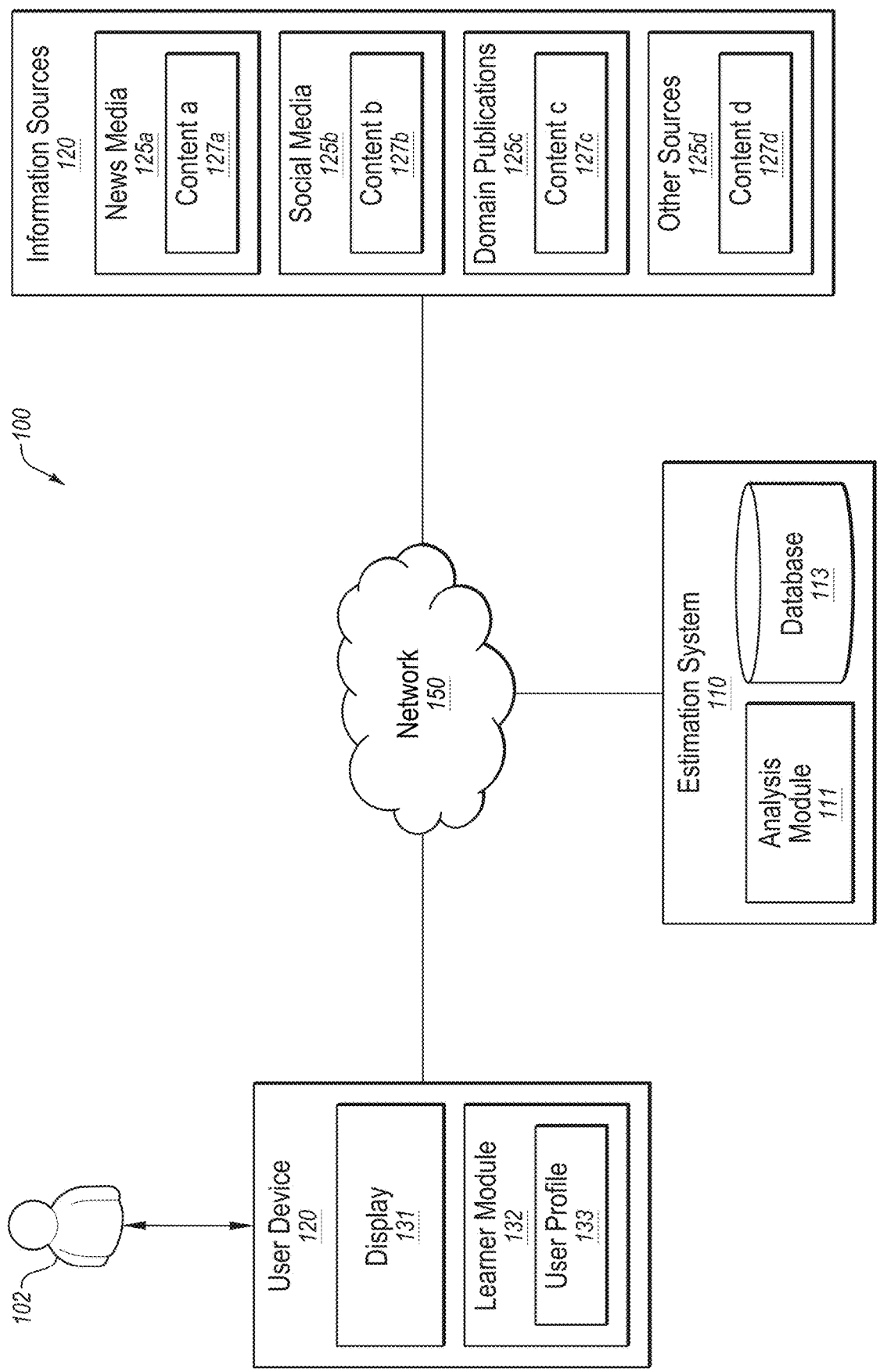
FIG. 1 is a diagram representing an example environment related to automatically estimating a difficulty level of documents.

Some embodiments described herein relate to extracting, analyzing, and determining a difficulty level for content fetched from the internet or another online network. In some instance, this difficulty level determination may be then used to recommend a subset of the content to a user. In some embodiments, the recommended content may correspond to a skill level or level of understanding of the user. In some instances, the user themselves may indicate their level of skill via a manual selection and in other instances, the user's skill level may be determined based on a user profile which has been previously created and stored.

The current fast-pace of technology, research, and general knowledge creation has resulted in previous and current methods of knowledge dissemination which are inadequate for appropriately correlating the appropriate information to a user such that the user can access content which is most helpful to them in furthering their education. Further, given the vast depth and amount of content which is available, there is seemingly no end to the amount of content which may be available to a user, including content created from a variety of different sources, including a variety of different authors and distribution platforms. Content is no longer generated by a few select individuals in select regions. Rather, researchers, professors, experts, and others with knowledge of a given topic, referred to in this disclosure as knowledgeable people, are located around the world and are constantly generating and sharing new ideas across a variety of different platforms.

Further, this vast amount of information and knowledge is available at varying different degrees of difficulty. Particularly within a technical subject, content available may vary from general discussions of a scientific principle which would be appropriate to a beginner or novice who is just being introduced to the topic to highly technical discussions of a minor aspect of that principle which would only be understood by those considered experts in the field. Unfortunately, at present there has not been a meaningful way to filter the information which is presented to a user so as to find the subset of available content which best fits their individual needs and understanding.

Rather, as a result of the Internet, the vast wealth of newly created knowledge from around the world is being shared worldwide in a continuous manner often without any way of meaningfully navigating according to technical difficulty. Rather, most search engines simply rely on a user's ability to generate increasingly technical search terms or Boolean inputs in order to reduce the results of their searches for information to meaningful data. Further, the vastness of available information also encourages users to limit their sources of knowledge to a subset of available sources which they are already aware of, as a means for self-filtering and eliminating content which is either too technical or too basic for the user.

In short, due to the rise of computers and the Internet, mass amounts of information (e.g., content) is available, but there is no realistic way for a person to reasonably access the information or obtain the information in a manner which is sorted according to difficulty so as to correspond to his or her technical understanding. Some embodiments described herein relate to extracting content, particularly technical content, generating a difficulty estimation for the content, and recommending a subset of the information to the user in order to help the user quickly and easily obtain the information that will be most likely to be helpful to them.

Various embodiments include performing an analysis of content available on the internet or other network to determine the difficulty or technical level of the content so as to recommend content to the user. As is described more fully below, the analysis of the content may include a variety of different types of analysis, including performing an analysis beyond simply the language of the content itself. This analysis may include analyzing equations, charts, metadata, tables, figures, in addition to merely analyzing the linguistics of the content. By analyzing this additional information which is often not utilized in other systems which perform only analysis of the language of the content, a more robust analysis can be performed in order to provide better content to a user.

In some embodiments, after receiving or performing a crawl to locate the content, the information of the content may be analyzed to organize the information within the content based on topics to identify knowledge points so as to identify a difficulty level of the content.

Embodiments of the present disclosure are explained with reference to the accompanying drawings.

FIG. 1 is a diagram representing an example system 100, arranged in accordance with at least one embodiment described in the disclosure. System 100 may include a network 150, an estimation system 110, a variety of different information sources 120 or content providers, including, for example news media 125*a*, social media 125*b*, domain publications 125*c*, and other content sources 125*d*, which as shown in FIG. 1, provide various different types of content a-d 125*a*-125*d* which would be available to a user 102 via a user device 130 connected to the network 150.

Examples of different types of news media 125*a* include various well-known online sources of content 125*a*, including technical content, which is provided by various news publications on a variety of different topics. Examples of such news media 125*a* sources include www.wired.com, www.zdnet.com, www.cnet.com/news/, among others.

Examples of different social media content 125*b* content providers include various social media platforms which support the distribution of content via the network 150, and include, for example, Twitter®, blogs, wikis, and various others. As would be understood, this may include links which are described or listed and which could be used to fetch corresponding content 125*b*.

Examples of domain publications 125*c* which are generally known as content providers include, but are not limited to DBLP, Arxiv, ACM Digital Library, IEEE Xplore Digital Library, and the like. Such domain publications 125*c* produce and distribute a variety of different types of content 125*d*, which may include, for example, white papers, research papers, journal articles, scientific papers, articles, and the like.

It should be understood that news media 125*a*, social media 125*b*, and domain publications 125*c* are just three different content sources which are specifically described herein, but it should be known that the system and methods herein can also be applied to other content sources without departing from the scope of the intended purpose and use of the system 100. More particularly, the information sources 120 described herein also include other sources 125*d* of content 125*d*, which are not expressly listed above, but which also may be analyzed by the estimation system 110 for a difficulty estimation in order to be recommended to the user 102.

The system 100 also includes a user device 130, which includes a display 135 on which content may be displayed to the user 102 and through which the user 102 may interact with a learner module 132 in order to interact with the estimation system 110. Further, a user profile 132 which may be used to store information about the user 102 and/or user preferences for continued use with the estimation system 110 as the user 102 interacts with the content 125*a*-125*d*.

The estimation system 110 may include an analysis module 111, which is used to perform various different types of analysis on the content 125*a*-125*d* received from the various information sources 120 so as evaluate the difficulty level or technical nature of the content 125*a*-125*d*. In some instances, this difficulty level may then be used to filter the content 125*a*-125*d* into a subset of content which is then presented to the user 102 via the user device 130. As is described herein, by determining the difficulty level of the content 125*a*-125*d*, the estimation system 110 is able to identify which subset of the available content 125*a*-125 is best suited for the user's 102 current technical understanding.

The network 150 may be configured to communicatively couple information sources 120, the estimation system 110, and device 130. In some embodiments, network 150 may be any network or configuration of networks configured to send and receive communications between devices. In some embodiments, network 150 may include a conventional type network, a wired or wireless network, and may have numerous different configurations. Furthermore, network 150 may include a local area network (LAN), a wide area network (WAN) (e.g., the Internet), or other interconnected data paths across which multiple devices and/or entities may communicate. In some embodiments, network 150 may include a peer-to-peer network. Network 150 may also be coupled to or may include portions of a telecommunications network for sending data in a variety of different communication protocols. In some embodiments, network 150 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. Network 150 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, network 150 may include one or more IEEE 802.11 wireless networks.

In some embodiments, any one of the information sources 120, estimation system 110, and the user device 130, may include any configuration of hardware, such as servers and databases that are networked together and configured to perform a task. For example, the estimation system 110 may include multiple computing systems, such as multiple servers, that are networked together and configured to perform operations as described in this disclosure and may include computer-readable-instructions that are configured to be executed by one or more devices to perform operations described in this disclosure.

The estimation system 110 may include a data storage or a database 113 in which information relating to the content 125a-125d is stored or collected. For example, the data storage 113 may include multiple data objects with different fields, corresponding to the various different types of analysis performed on the content 125a-125d to identify and estimate the difficulty level of the content 125a-125d.

In general, the estimation system 110 may be configured to obtain or receive content 125a-125d from various different information sources 120. This content may include articles, lectures, and other publications from various information sources 120. Using information from the content 125a-125d, including, but not an analysis of the language of the content 125a-125d, in addition to an extensive analysis of non-linguistic elements of and associated with the content 125a-125d, the estimation system 110 generates an estimation of the difficulty of the content 125a-125d. The analysis of the language itself of the content 125a-125d, may include an analysis and identification of key phrases or concepts which may be used to identify knowledge points of the content 125a-125d. In some instances, the linguistic analysis may also include an identification of an author of the content 125a-125d to determine whether the author is known to have a particular understanding of a concept or is considered to be an expert in a field, which could correspond to the level of difficulty of their work.

The analysis of non-linguistic elements of the content 125a-125d includes an analysis of elements other than the text of the content itself 125a-125d, such as an analysis of the metadata associated with the content 125a-125d, any equations, formulas, figures, charts, or tables embedded in or associated with the content 125a-125d which would not otherwise generally be analyzed in a traditional language-only evaluation of the content.

Device 130 may be associated with a user 102 of the system 100. In these and other embodiments, device 130 may be any type of computing system. For example, device 130 may be a desktop computer, tablet, mobile phone, smart phone, or some other computing system. Device 130 may include an operating system that may support a web browser. Through the web browser, device 130 may request webpages or content 125a-125d from the various information sources 120 via the estimation system 110, which the user 102 has requested perform an estimation and recommendation of the content 125a-125d based on technical suitability to the user 102. The requested content 125a-125d may be displayed on the display 131 of device 130 for presentation to the user 102 of device 130.

Modifications, additions, or omissions may be made to system 100 without departing from the scope of the present disclosure. For example, system 100 may include multiple other devices that obtain information or content from information sources 120 or which request information about the content 125a-125d of the information sources 120 from the estimation system 110.

Figure 2:
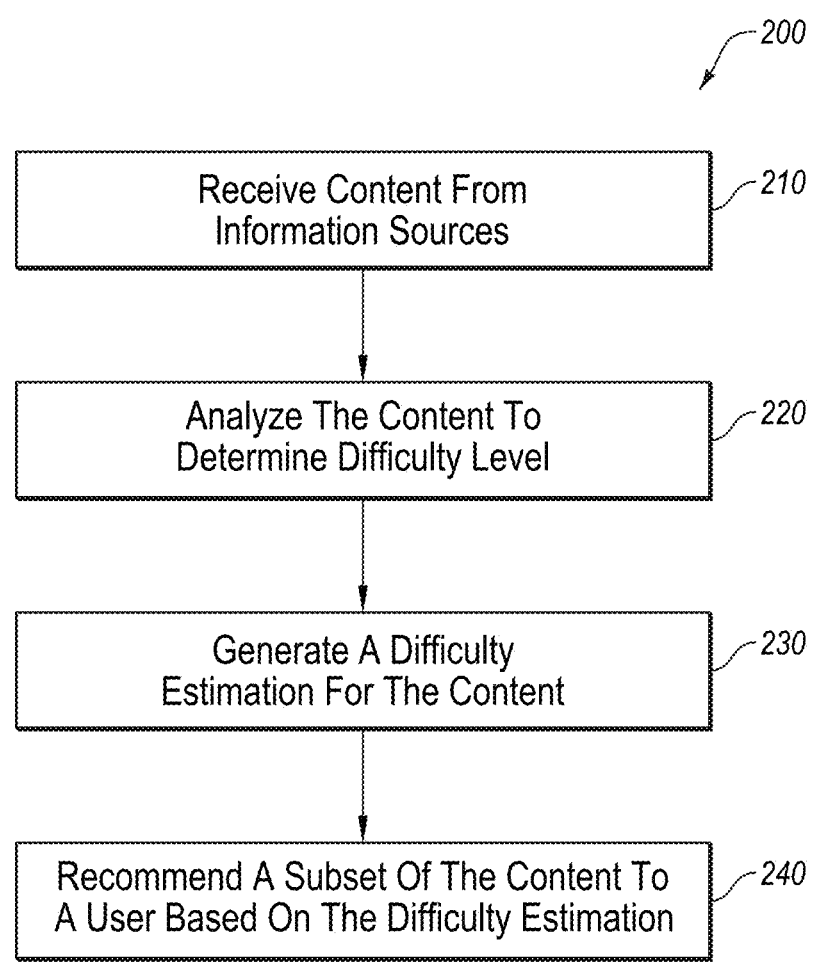
FIG. 2 is a flowchart illustrating an example of a method for estimating a difficulty level of online content according to one embodiment.

FIG. 2 is a diagram of an example flow 200 that may be used to generate a difficulty level of content, according to at least one embodiment described herein. In some embodiments, the flow 200 may be configured to illustrate a process to receive, analyze, and recommend a subset of content from various information sources. In these and other embodiments, a portion of the flow 200 may be an example of the operation of system 100 of FIG. 1.

The flow 200 may begin at block 210, wherein content 125a-125d may be obtained. As was previously described, the content 125a-125d may comprise digital documents which may be obtained from one or more sources, such as websites and other sources. The content 125a-125d may be a publication, lecture, article, blog, wiki, paper, journal, or other document. In some embodiments, the content 125a-125d may be a recent document, such as document released within a particular period, such as within the last week, month, or several months. In one embodiment, the content 125a-125d may all be related to a search request generated by the user 102 with respect to a particular subject or topic, wherein the content 125a-125d is performed by doing a search or crawl of the network 150 for content 125a-125d which may be related to the requested subject.

At block 220, the content 125a-125d is analyzed to determine the difficulty thereof and to generate a difficulty estimation of the content 125a-125d. As will be described more fully below, this analysis may include various different types of analysis, which, when performed together give a more robust analysis of the content 125a-125d as compared to a mere analysis of the text contained therein.

At block 230, a difficulty estimation for the content 125a-125d is generated based on the analysis of the content 125a-125d. This difficulty estimation may comprise a designation of the content 125a-125d as a "beginner," "intermediate," or "expert level," or may involve any other number of ways of providing an estimation, including ranking the content 125a-125d by technical difficulty, assigning the content 125a-125d a numerical or other value which would correspond to a level of difficulty or the like.

At block 240, a subset of the available content 125a-125d is presented to the user 102 based on the difficulty estimation. More particularly, in some instances, based on an indication of the user's technical understanding, which may either be provided by the user 102 via a selection interface of the learner module 132 or may be based on a user profile 133 generated by the learner module 132 based previous searches performed by the user 102 or other information gathered and analyzed about the user 102.

As may be understood, by using the system and method described above with respect to FIGS. 1 and 2, the user 102 is able to perform a more meaningful search of the available content 125a-125d, wherein the content 125a-125d is sorted and ranked according to technical difficulty so as to identify the content 125a-125d which is best suited to increasing the user's understanding of a particular topic.

Modifications, additions, or omissions may be made to the flow 200 without departing from the scope of the present disclosure. For example, the operations of flow 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments. In short, flow 200 is merely one example of data flow for receiving, analyzing, and presenting content to a user and the present disclosure is not limited to such.

Part of the process for receiving or fetching content 125a-125d may include filtering all the various content which is available according to a specific topic, such as searching through the content 125a-125d according to a given topic and performing topic model analysis on the content 125a-125d. In some instances, this topic may be provided by the user 102.

Figure 3:
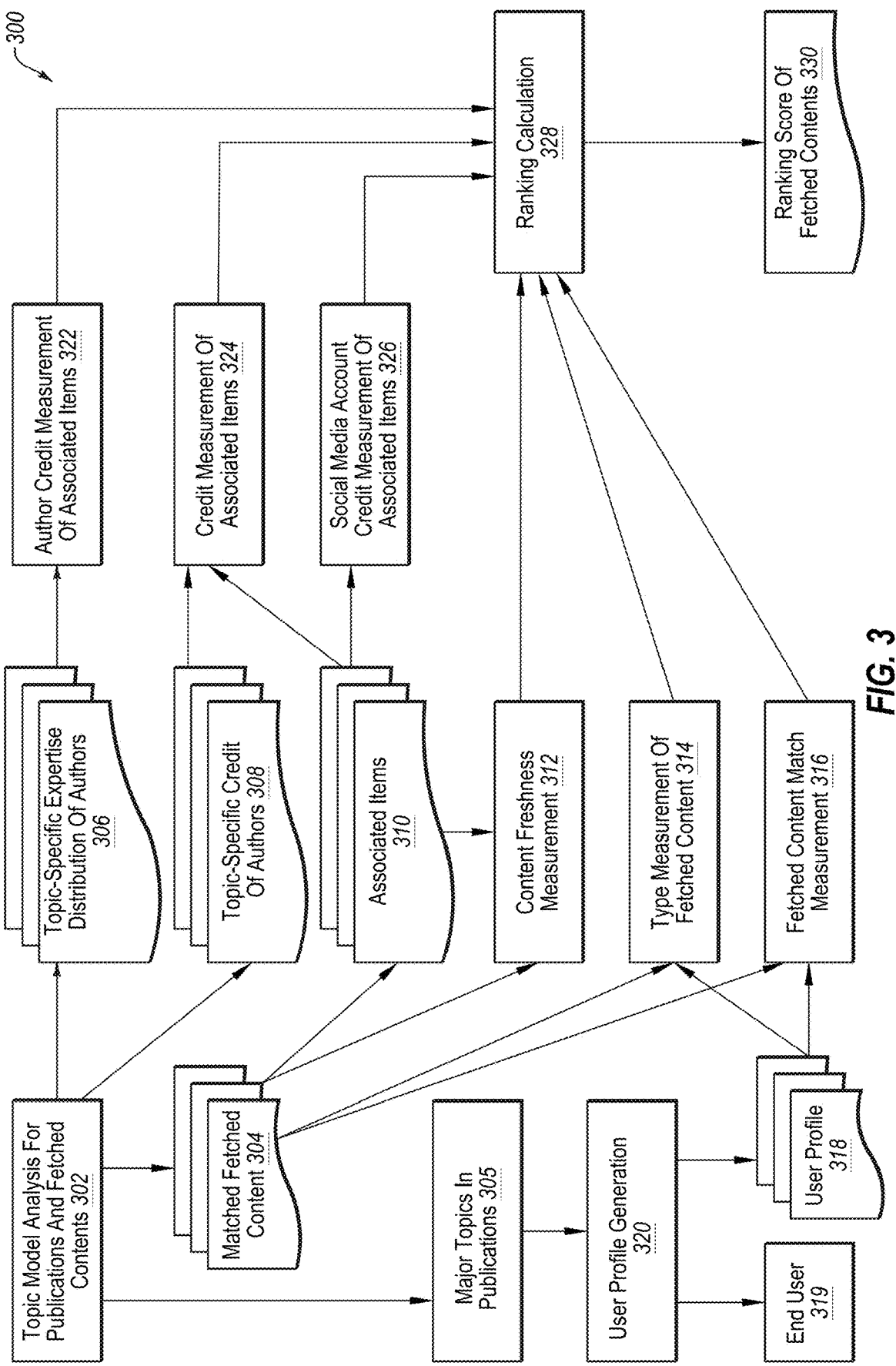
FIG. 3 is a flowchart illustrating an example of a method for ranking content from various information sources according to one embodiment.

FIG. 3 is a diagram of an example flow 300 that may be used for ranking content 125a-125d fetched or received from the various information sources 120, according to at least one embodiment described herein. In some embodiments, flow 300 may be configured to illustrate a process to rank content 125a-125d fetched various information sources 120. In these and other embodiments, a portion of flow 300 may be an example of the operation of system 100 of FIG. 1.

It should be noted that a detailed example of the topic model analysis which may be performed is described in U.S. Patent Publication No. 2018/0046628, entitled "Ranking Social Media Content," the contents of which are incorporated herein by reference, although other methodologies may be used.

Flow 300 may begin at block 302, wherein a topic model analysis for publications and fetched content 125a-125d may be performed. The topic model analysis may generate matched fetched content 304, major topics in publications 305, topic-specific expertise distribution of authors 306, and topic-specific credit of authors 308.

Fetched content 304 may be linked from associated items 310. Further, fetched content 304 may be used in various measurements, such as a content freshness measurement 312, a type measurement of fetched content 514, a fetched content match measurement 316.

Topic-specific expertise distribution of authors 306 and topic-specific credit of authors 308 may be used in an author credit measurement of associated items at block 322. Further, as described more fully below, associated items 310 may be used in author credit measurement of associated items at block 322, credit measurement of associated items at block 324 and a social media account credit measurement of associated items at block 326.

At block 312, a content freshness measurement to generate content age data may be performed based on fetched content 304 and corresponding associated items 310. In one embodiment, the content age data may comprise a content freshness score, which may be based on an age of the fetched content 304, an age of one or more associated items 310 (e.g., tweets, posts, etc.), or a combination thereof.

At block 314, a type measurement of fetched content to determine a type score of content 304 fetched from various information sources. For example, the content type score may be based on user defined type preferences (e.g., as defined in user profile 318) for content type (e.g., articles, papers, slides, videos, pictures, audio, etc.). More specifically, for example, a user may assign weights to content types, and these assigned weights may be used in determining the social media content type score. For example, a user (e.g., end user 319) may prefer videos over other content, thus, in this example, videos may be assigned a weight that is greater than weights assigned to other content.

At block 320, a user profile 318 may be generated based on major topics in publications 305 and data from end user 319.

At block 316, a fetched content match measurement to determine a match score of content fetched from the information sources may be performed. The fetched content match measurement, which may be based on user profile 318 and fetched content 304, may include comparing a topic distribution of fetched content 304 and user interest data (e.g., as defined user profile 318), which may include an interest topic distribution of end user 319. For example, the fetched content match measurement may determine a match between topic distributions of the fetched content and an interest topic distribution of a user. More specifically, for example, a measure of the difference between two probability distributions (e.g., Kullback-Leibler divergence) may be determined.

At block 322, an author credit measurement of associated items may be performed. After identifying and matching a real author who owns a social media account including a posted item associated with the current fetched content, various scores may be calculated. For example, a network score for each author based on, for example, a citation network and a co-author network in publications may be calculated using one or more methods, such as a Page Rank and betweeness centrality. In addition, a consistency score for each author may be calculated. As an example, topic-specific expertise distribution of author 306 and topic-specific credit of author 308 may be mixed by calculating a dot product to identify an enhanced topic-specific expertise distribution of author. Furthermore, we can calculate Kullback-Leibler divergence between the enhanced topic-specific expertise distribution of author and topic distribution of user interest to generate the consistency score.

At block 324, a credit measurement based on associated items 310 may be performed. For example, statistics of the items associated to the current fetched content, such as, a number of reposts, a number of likes and/or bookmarks, and/or a number of views of associated items may be used in the credit measurement to determine the social media item credit score. Further, weights, which may be assigned to one or more actions, such that one action (e.g., a repost) may have a higher value than another action (e.g., a view), may be considered in determining the social media item credit score. In one embodiment, the social media item credit score may be a linear combination of two or more statistics related to the actions. Further, an average credit of all items associated with the current fetched content may be calculated.

At block 326, a social media account credit measurement based on associated items 310 may be performed using statistics of a social media account that posted the associated item. Statistics for the social media account may include a social media account credit score, which may be based on various factors associated with the social media account. For example, the social media account credit score may be based on a social network analysis including a number of followers of the social media account, a number of times the social media account has been included in public lists, and/or a page rank of the social media account. Further, if the user (e.g., end user 319) also has a social media account, the following may be considered in determining the social media account credit score: 1) whether the user has a social connection with the social account (e.g., via social media); and 2) whether the user has ever interacted with the social media account (e.g., via social media), such as the social media account was mentioned by the user in social media.

In one embodiment, the social media account credit score may be a linear combination of two or more factors associated with the fetched content. Further, an average social media credit of all items associated with the current fetched content may be calculated.

At block 328, a ranking calculation may be performed to rank each fetched content from the various information sources. For example, the ranking may be based on one or more factors, such as user interest data (e.g., in relation to topic distribution of interests), user preference data (e.g., in relation to preferred types of content), statistics for the associated items of the fetched content (e.g., a number of reposts of an item, a number of likes for the item, a number of views of the item, a number of times the item is bookmarked, etc.), author data (e.g. including citation networks and co-author networks, the author's interest and/or expertise in a topic), statistics for a social media account or information source posting associated items (e.g., a number of followers of the social media account or news source, a number of times the social media account or news source has been included in public lists, and/or a PageRank of the information source, whether the user has connected or ever interacted with the information source, whether the information source is mentioned in other items, etc.), content age data (e.g., content freshness), or any combination thereof.

At block 330, ranking scores of fetched content 330 may be generated.

Modifications, additions, or omissions may be made to flow 300 without departing from the scope of the present disclosure. For example, the operations of flow 300 may be implemented in differing order. This is also applies to the flows 400, 500, 800, 1100, and 1600 described in detail below. Furthermore, the outlined operations and actions are only provided as examples, and some of the operations and actions may be optional, combined into fewer operations and actions, or expanded into additional operations and actions without detracting from the essence of the disclosed embodiment.

Figure 4:
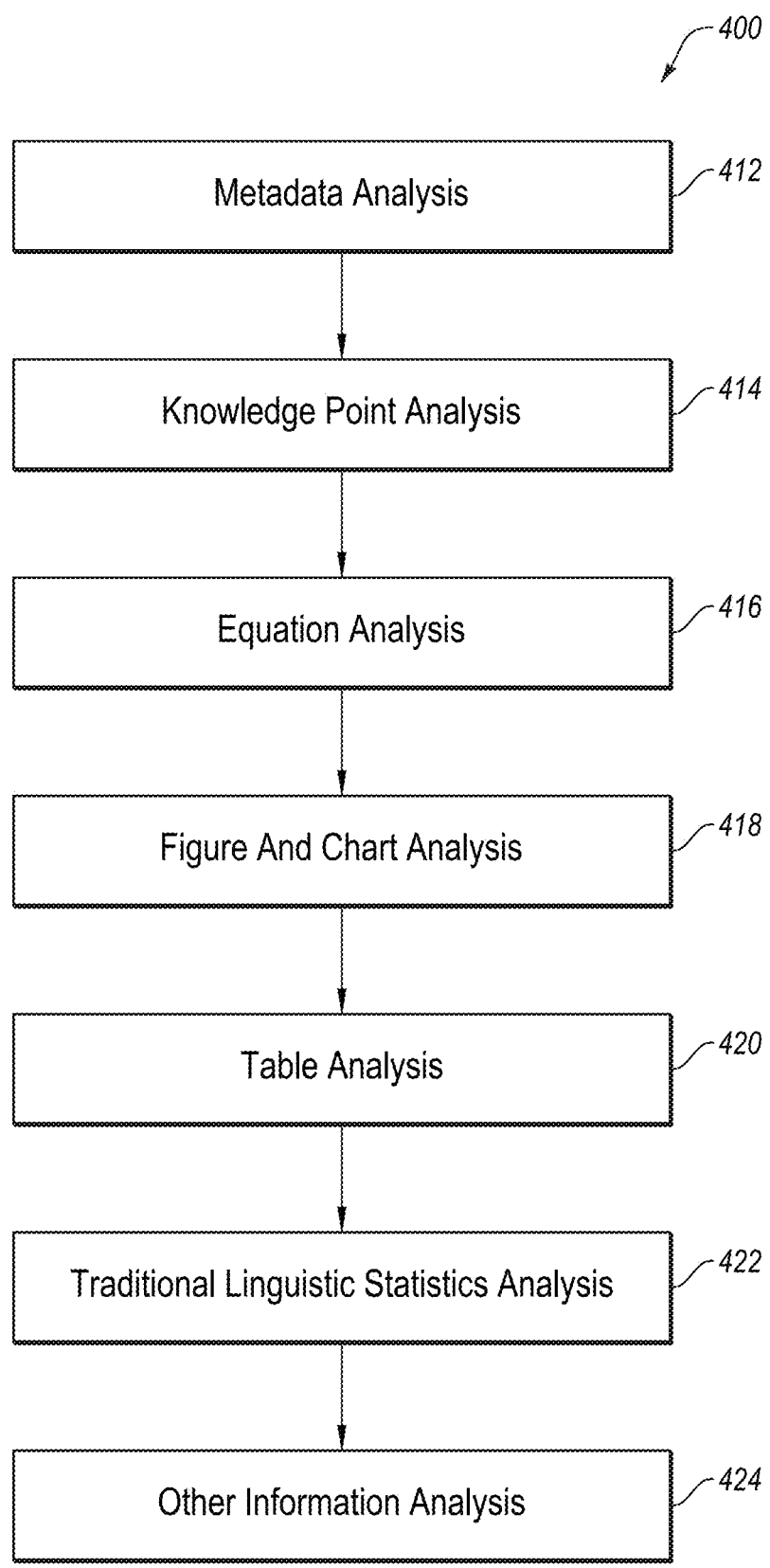
FIG. 4 is a flowchart illustrating an example of a method for performing an analysis of the online content according to one embodiment.

FIG. 4 depicts a diagram of an example flow 400 that may be used for performing an analysis of the content 125a-125d, according to at least one embodiment described herein. In some embodiments, flow 400 may be configured to illustrate a process to analyze fetched content 125a-125d from a variety of information sources 120 in order to assess a difficulty level of the content 125a-125d. In these and other embodiments, a portion of flow 400 may be an example of the operation of system 100 of FIG. 1.

Flow 400 may begin at block 412, with an analysis of the metadata associated with the content 125a-125d. As may be known in the art, this may include extracting keywords from the metadata, identifying a source type of the content 125a-125d, such as determining whether the source is a scientific journal or database versus a smaller blog entry for a relatively unknown and uncited author, and identifying the document type of the content 125a-125d, such as determining whether the content is a web page, pdf, presentation, word document, or the like.

At block 414, a knowledge point analysis may be performed on the content 125a-125d. In some instances, this analysis may be performed according to the process and method described below with respect to FIGS. 5-7.

Figure 10:
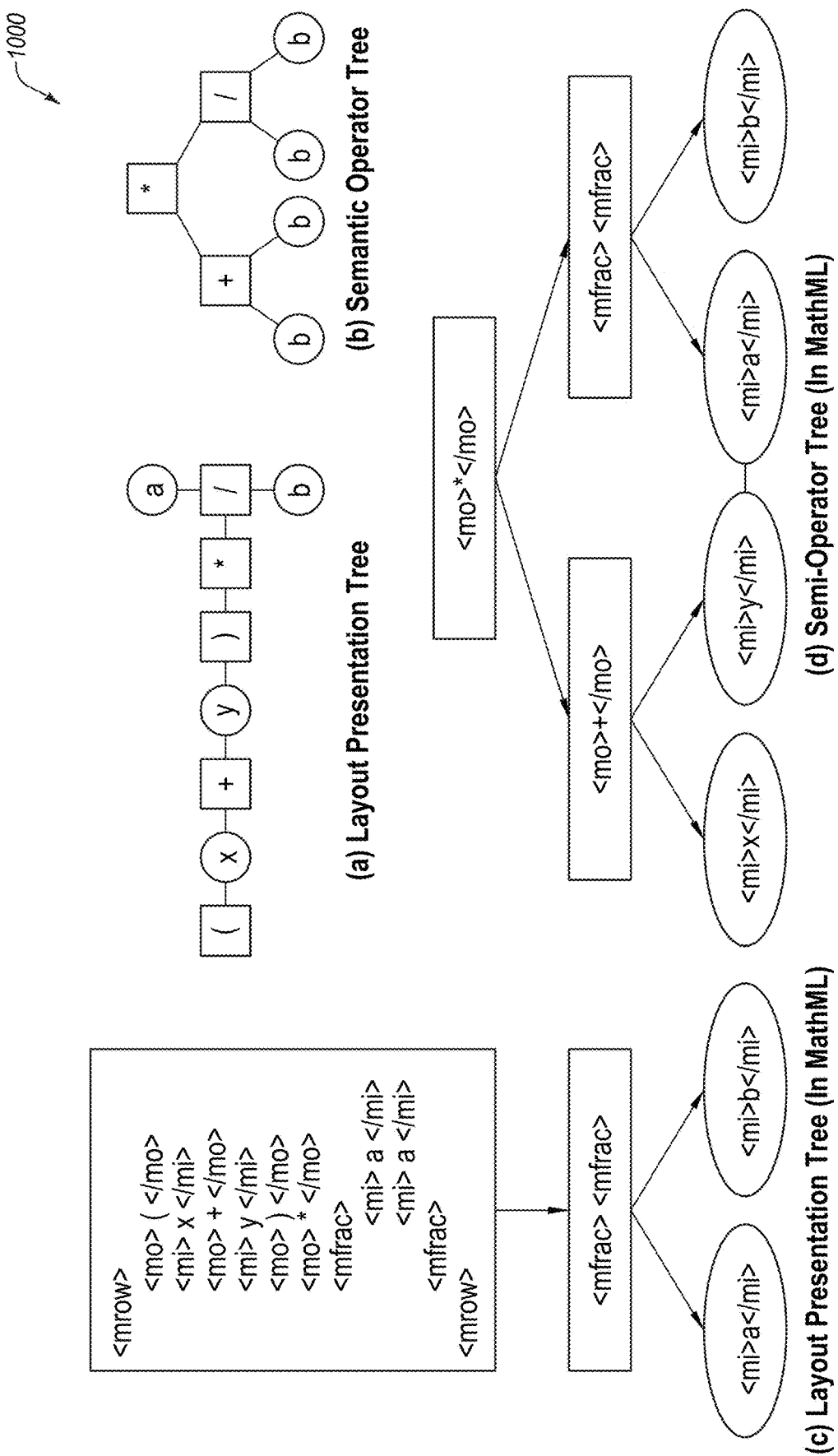
FIG. 10 is an example of an equation which may be converted and analyzed according to one embodiment.

At block 416, an equation analysis may be performed on the content 125a-125d to identify any equations or formulas which may be contained in the content 125a-125d and to perform an estimation of their level of difficulty. In some instances, this analysis may be performed according to the process and method described below with respect to FIGS. 8-10.

At block 418, an analysis is performed on the content 125a-125d to identify any figures or charts which may be contained in the content 125a-125d and to perform an estimation of their level of difficulty. In some instances, this analysis may be performed according to the process and method described below with respect to FIGS. 11-13.

At block 420, an analysis is performed on the content 125a-125d to identify any tables which may be contained in the content 125a-125d and to perform an estimation of their level of difficulty. In some instances, this analysis may be performed according to the process and method described below with respect to FIGS. 14-15.

At block 422, an analysis is performed on the content 125a-125d to analyze the language contained in the content 125a-125d in order to obtain an estimation of their level of difficulty. In some instances, a language learning system may be used. One example of a system and method which may be used for this process is found in "Text Readability Assessment for Second Language Learners," by Menglin Xia, et al., published in the Proceedings of the 11$^{th}$ Workshop on Innovative Use of NLP for Building Educational Applications (BEA 2016).

At block 424, other information analysis may be performed on the content 125a-125d to identify if there are any remaining evidences of the difficulty level of the content 125a-125d, which may be known to the analysis module 111. This may involve any previous times that the content 125a-125d was presented to a user 102 and the user 102 re-designated its difficulty level or indicated that it was either more technical or less technical than the analysis module 111 previously estimated or any other indicia from external references indicating the difficulty level of the content 125a-125d.

Although it should be understood with respect to FIG. 4 that the various different steps can be performed in any number of different orders and may include a number of discrete different types of analysis which may be simultaneously or sequentially performed, and may be performed by different modules or devices.

Figure 5:
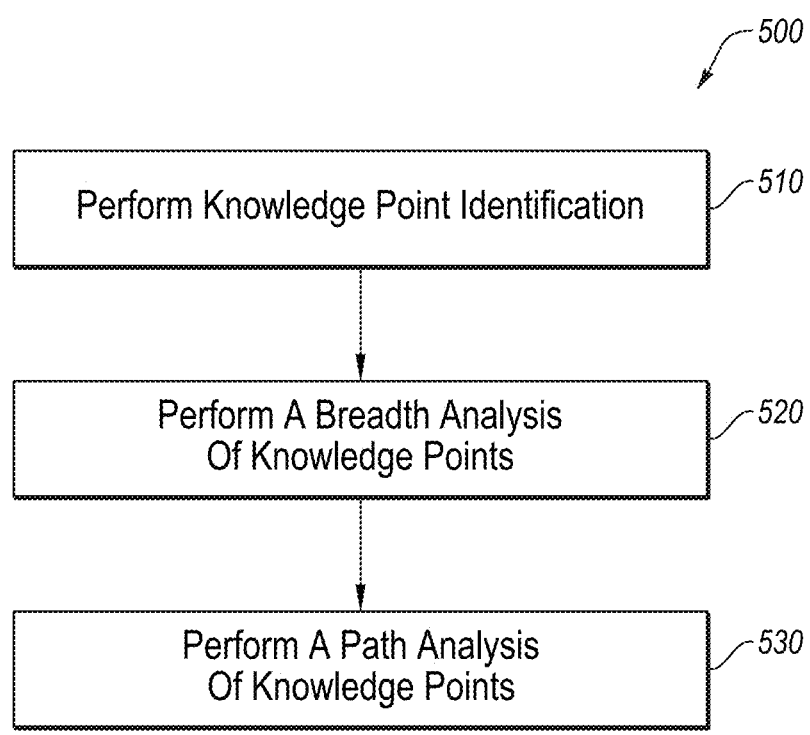
FIG. 5 is a flowchart illustrating an example of a method for performing a knowledge point analysis of the online content according to one embodiment.

FIG. 5 depicts a diagram of an example flow 500 that may be used for performing a knowledge point analysis of the content 125a-125d, according to at least one embodiment described herein, and which may comprise at least a portion of block 414 in FIG. 4. In some embodiments, flow 500 may be configured to illustrate a process to analyze fetched content 125a-125d from a variety of information sources 120 in order to assess the various knowledge points of the content 125a-125d. In these and other embodiments, a portion of flow 500 may be an example of the operation of system 100 of FIG. 1.

Figure 6:
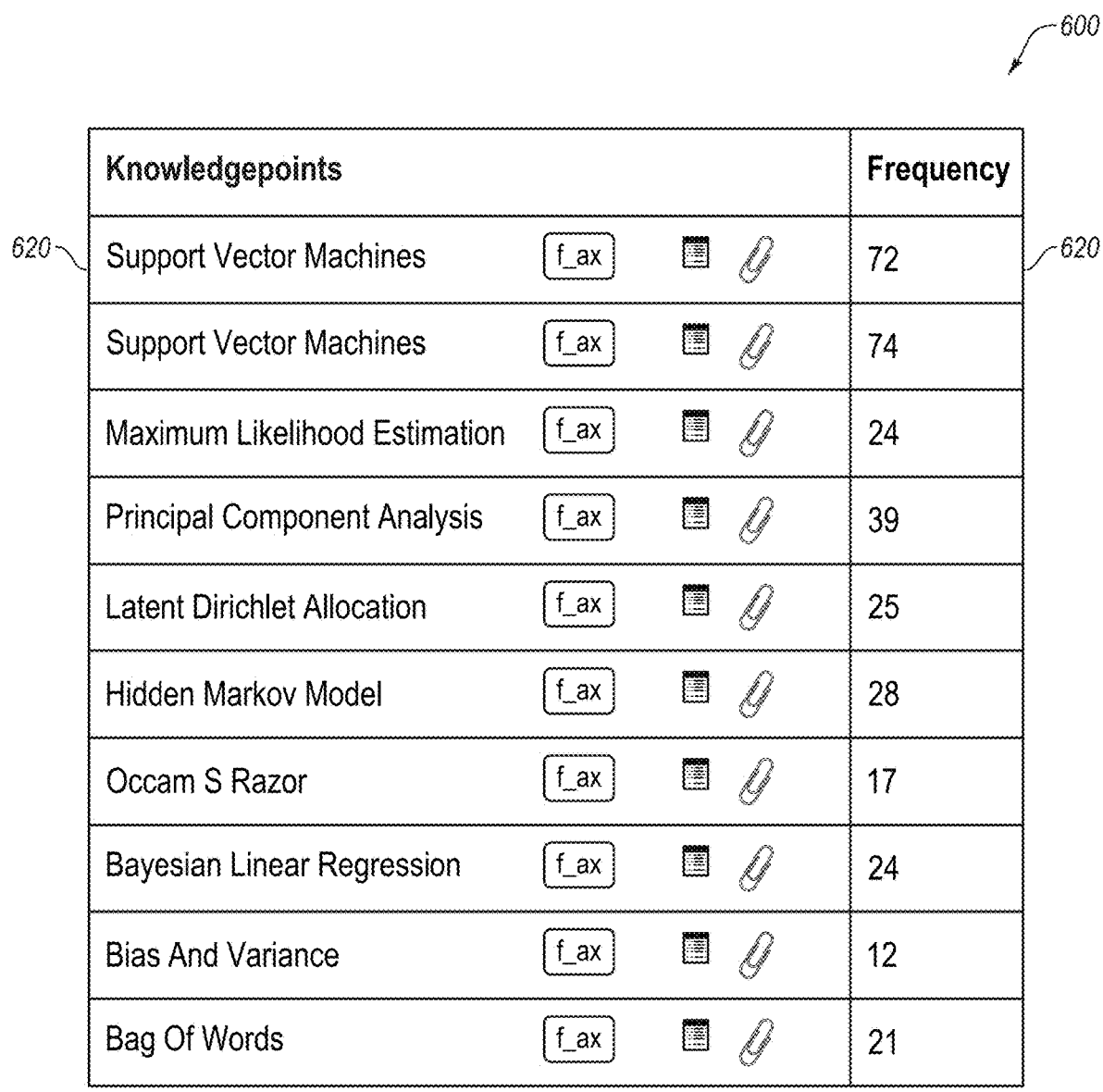
FIG. 6 illustrates a list of various examples of knowledge points which may be identified according to one embodiment.

Flow 500 may begin at block 510, where a series of knowledge points are identified within the content 125a-125d. This may involve identifying key phrases which represent knowledge points for technology, and may include machine learning and the methods and systems described in U.S. Publication No. 2017/011642, entitled "Extraction of Knowledge Points and Relations from Learning Materials," which is incorporated by reference herein. For example, FIG. 6 illustrates a list 600 of various knowledge points 620 which may be identified for a given topic, in this instance the topic is "machine learning," with the frequency 610 being an indication of the frequency of which those knowledge points are used in content 125a-125d which is related to that topic.

Returning to FIG. 5, at block 520, an analysis is performed to measure the breadth among the knowledge points identified at block 510. For example, less technical and introduction documents related to a particular topic often contain knowledge points corresponding to higher level knowledge points and general concepts, whereas more professional and expert level documents requiring a higher level of technical understanding often contain knowledge points of a lower level and are directed to narrower or more specific concepts. One example of a manner in which a measurement of the breadth among knowledge points may be obtained is found in U.S. Publication No. 2017/011642, entitled "Extraction of Knowledge Points and Relations from Learning Materials," cited above, and using Gaussian embedding of knowledge points according to the teachings of "Word Representations via Gaussian Embedding," by Luke Vilnis, et al., ICR (2015). According to Vilnis teachings, a covariance matric M of Gaussian distribution may be used as a good indicator of breadth of a knowledge point. The matrix M may then be converted in to Diagonalized DM in order to calculate a breadth_score=1/Tr(DM), which may be used quantify knowledge points of the content 125a-125d.

Figure 7:
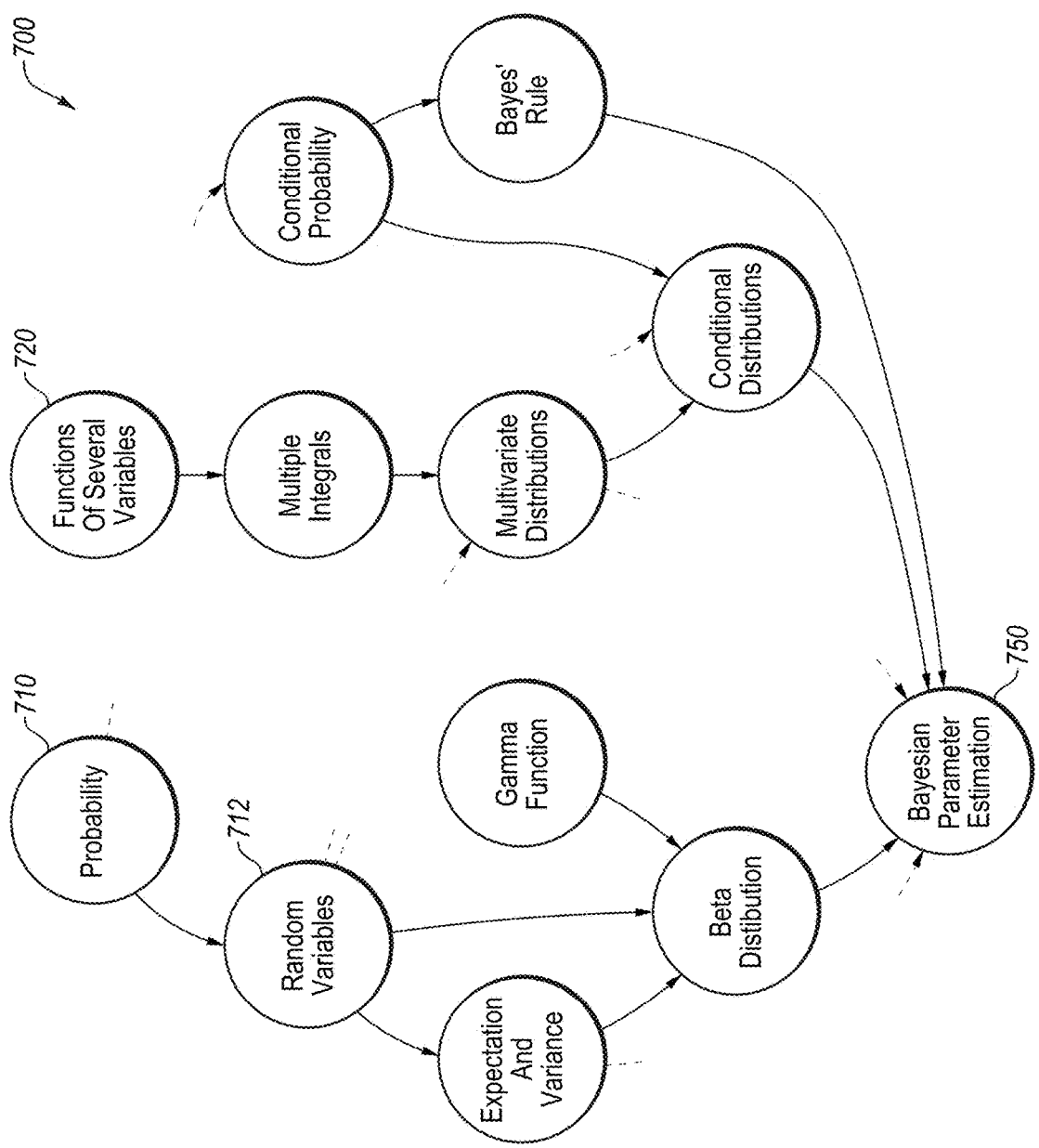
FIG. 7 illustrates an example of a path which may be analyzed according to a path analysis process of the online content according to one embodiment.

At block 530, a path analysis of the knowledge points may be performed. For example, as is shown in FIG. 7, it is generally considered that the position or order in which a knowledge point is learned is relevant to determining the complexity of a subject. For example, in the path 700 shown in FIG. 7, an understanding of probability 710 must be mastered before an understanding of how random variables 712 may be obtained. Further, additional knowledge points and topics may be required as the complexity is increased. For example, in order to appropriately understand a Bayesian Parameter Estimation, an understanding of basic principles like probability 710 and functions of several variables 720 must be mastered in addition to various intermediate steps including random variables 712 and the others shown in FIG. 7. As such, it may be inferred that the topic of probability is more general or less technical than a discussion on Bayesian Parameter Estimation. As such, one way of quantifying the knowledge points is to use a depth_score=log(step) function, where the greater number of steps from a top level concept indicates a greater depth of understanding and a greater difficulty or technicality.

As may be understood, these various estimations and scores may all be used to help quantify the difficulty of the content 125a-125d, and may be used in association with the aggregate estimation generated in FIG. 16 as is described below.

Figure 8:
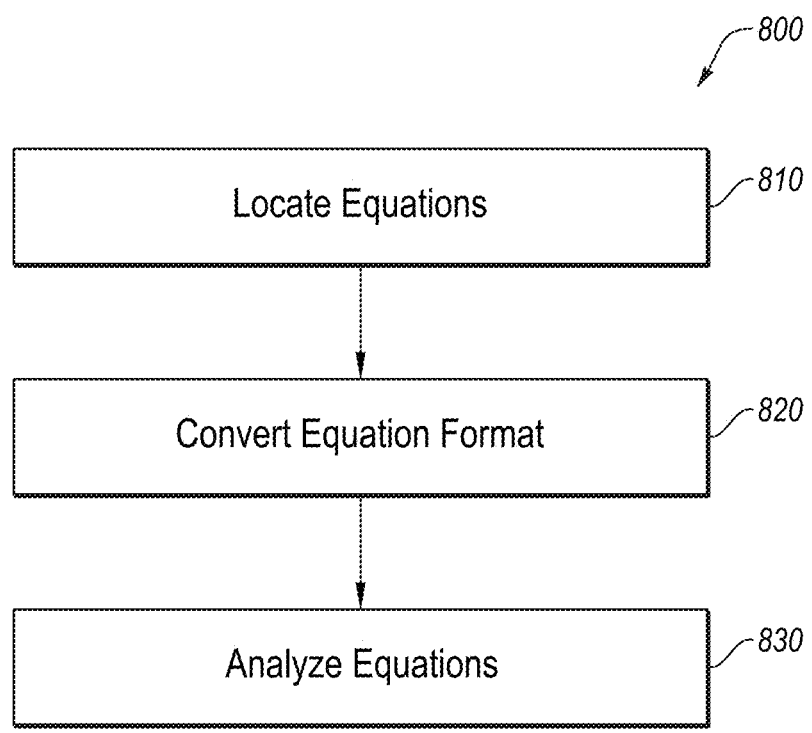
FIG. 8 is a flowchart illustrating an example of a method for performing a analysis of the equations or formulas of the online content according to one embodiment.

FIG. 8 depicts a diagram of an example flow 800 that may be used for performing an analysis of the equations or formulas located within the content 125a-125d, according to at least one embodiment described herein, and which may comprise at least a portion of block 416 in FIG. 4. In some embodiments, flow 800 may be configured to illustrate a process to analyze the equations or formulas within a piece of content 125a received from an information source 120 in order to assess the difficulty level of the content 125a, and may be an example of the operation of system 100 of FIG. 1.

Flow 800 may begin at block 810, where the content 125a is parsed to locate any equations or formulas contained therein. This may involve performing a number of different operations on the content 125a including identifying any equations or formulas which are illustrated as a picture within a web page and performing an OCR or Optical Character Recognition process on the picture, or identifying any Mathjax, Katex, LaTeX or other script which is used to display mathematical notation in web browsers. One example of how a mathematical formula may be identified is found in U.S. Pat. No. 9,928,415, entitled "Mathematical Formula Learner Support System," which is incorporated herein by reference in its entirety. It should be understood that a similar mechanism may be used to identify any chemical formulas contained in the content 125a.

At block 820, the identified equations or formulae are converted into a format which may be used to quantify their complexity. For example, in the process 900 illustrated in FIG. 9, the equation 920 embedded in the pdf 910 may be converted into either LaTeX format 930 or MathML format 940.

At block 830, the converted equations or formulae are then analyzed to determine the complexity therein. In some instances, this may involve parsing an equation to identify the statistics of the number and type of operators within an equation. For example, in FIG. 10, an equation 1000 may be parsed to identify the operators within the equation. One example of a system and method which may be used is described in "A Mathematics Retrieval System for Formulae in Layout Presentations," Lin et al., SIGIR (2014).

Once an equation or formula is in the desired format, the equation or formula may be parsed and the result of the parsing may be used as a measurement of the complexity of the content 125a. For example, some operators, such as addition, subtraction, multiplication, and division may be determined to be quite basic, whereas other operators associated with more complex mathematics may be more advanced. Additionally, the number of equations contained in a piece of content 125a may be evaluated. As such, a piece of content 125a with few equations which only cite quite basic mathematical operators would likely indicate that the content 125a requires only a basic understanding of technology in order for a user to understand the technology. In contrast, a technical specification including multiple equations, each of which contains mathematical operators which are more complex and with more complex equations likely means that the associated content 125a would be best suited for one with a more advanced or expert level of understanding.

Figure 11:
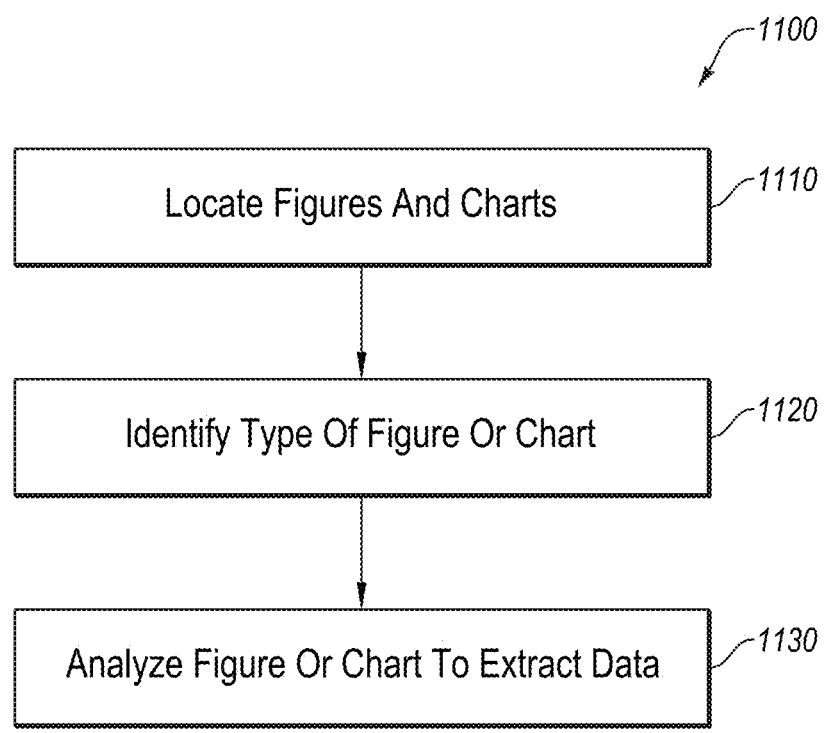
FIG. 11 is a flowchart illustrating an example of a method for performing a analysis of the figures and charts of the online content according to one embodiment.

FIG. 11 depicts a diagram of an example flow 1100 that may be used for performing an analysis of the figures and charts located within the content 125a-125d, according to at least one embodiment described herein, and which may comprise at least a portion of block 418 in FIG. 4. In some embodiments, flow 1100 may be configured to illustrate a process to analyze the non-linguistic content captured in a figure or chart within a piece of content 125a received from an information source 120 in order to assess the difficulty level of the content 125a, and may be an example of the operation of system 100 of FIG. 1.

Flow 1100 may begin at block 1110, where the content 125a is parsed to locate any Figures and/or charts contained therein. Various tools may be used in this process, including parsing web pages using Google Puppeteer® or the like and parsing .pdf Adobe® files using Tabula®. Once the data is extracted at block 1110, at block 1120, the type of Figure and/or Chart is identified.

Figure 12:
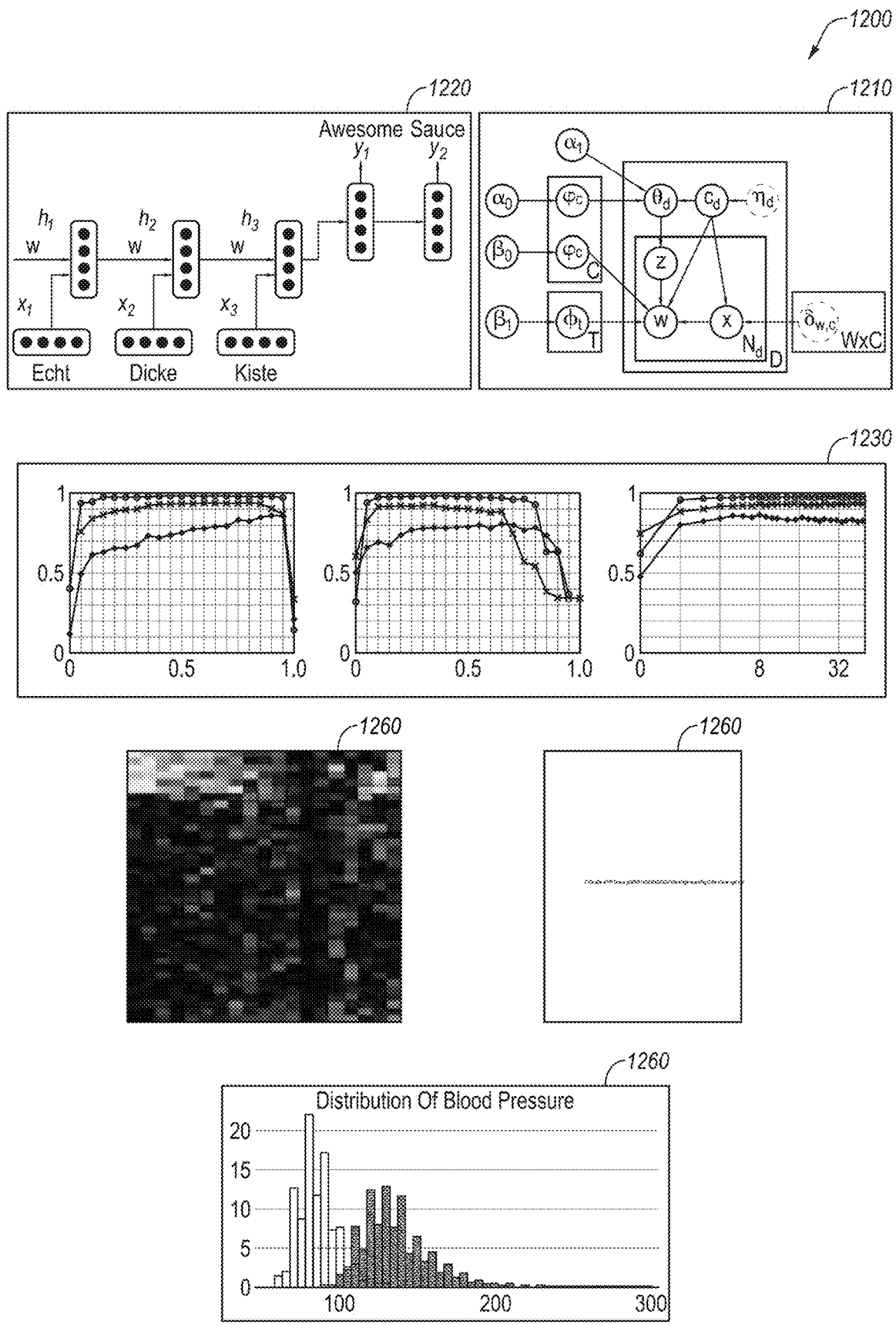
FIG. 12 illustrates an example of a variety of different types of figures and charts which may be identified according to one embodiment.
Figure 13:
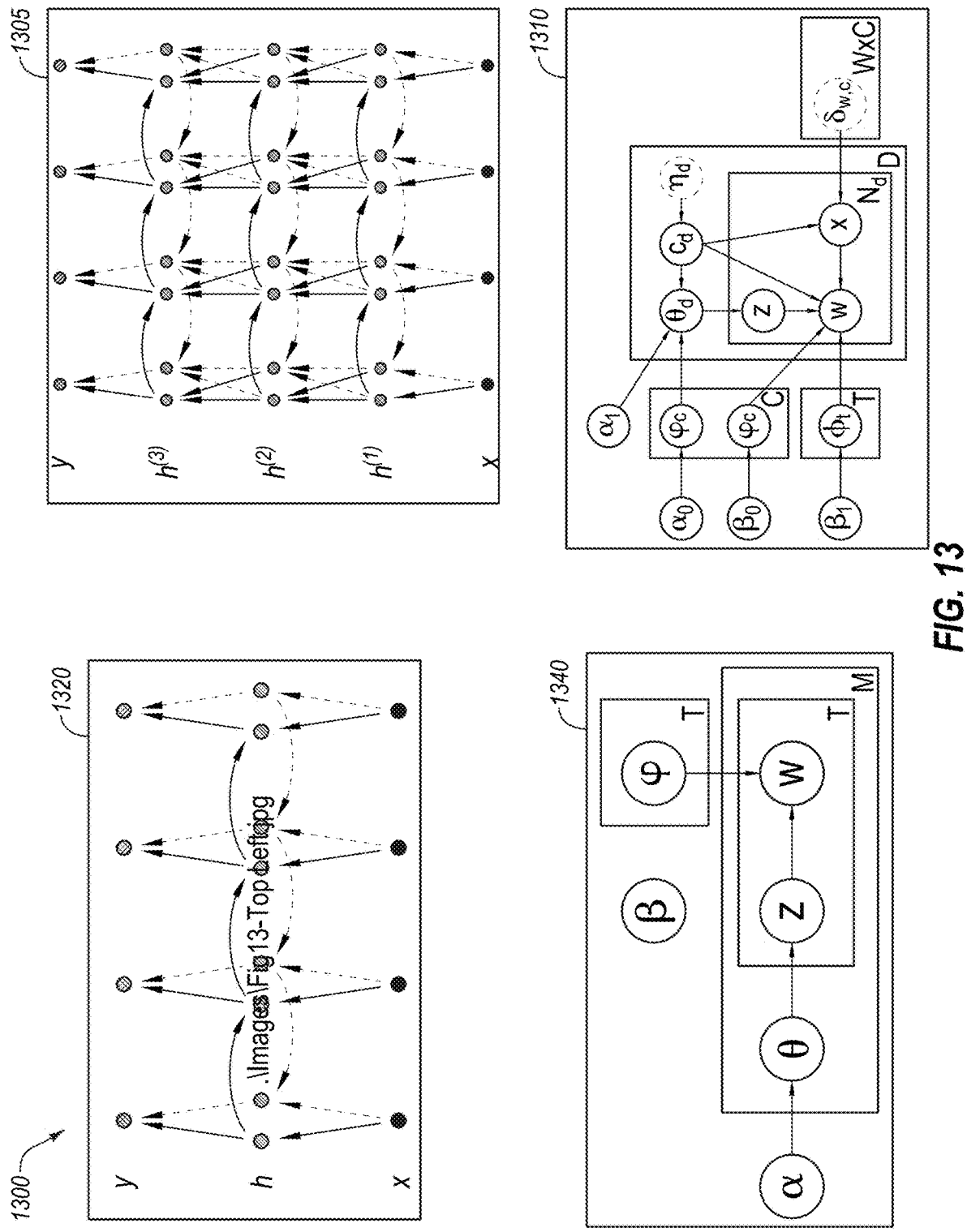
FIG. 13 is an example of two different charts which may be analyzed according to the method described in one embodiment.

FIG. 12 illustrates a variety of different types of figures and charts which may be identified. For example, FIGS. 1210 and 1220 correspond with Figures illustrating the structure of a system, chart 1230 illustrates three different visualization plots. Other types of charts, graphs, and figures may be used including heat maps, such as shown in charts 1240 and 1250, bar graphs illustrating a distribution curve such as shown in 1260 and any other number of charts, graphs, and other graphical representations which are known.

At block 1130, the figures and charts may be analyzed in order to gauge their complexity. For example, in the examples shown in FIG. 13, the sequence model of a Recurrent Neural Network (RNN) shown in FIG. 1320 is relatively simple, whereas the sequence shown in FIG. 1305 is more complex. Similarly, the Topic Model 1340 is simpler than the more complex Model 1310. The complexity of the figures may be analyzed by quantifying the number of components (circles or blocks) and the number of connections. Other charts may be deemed less complex by the type of chart shown. For example pie charts, bar graphs, line graphs and the like are relatively simple ways of illustrating data. More complex charts may correlate to more complex topics. In this manner, the system and method may generate an estimation of the complexity of the figures and charts contained in the content 125a.

Figure 14:
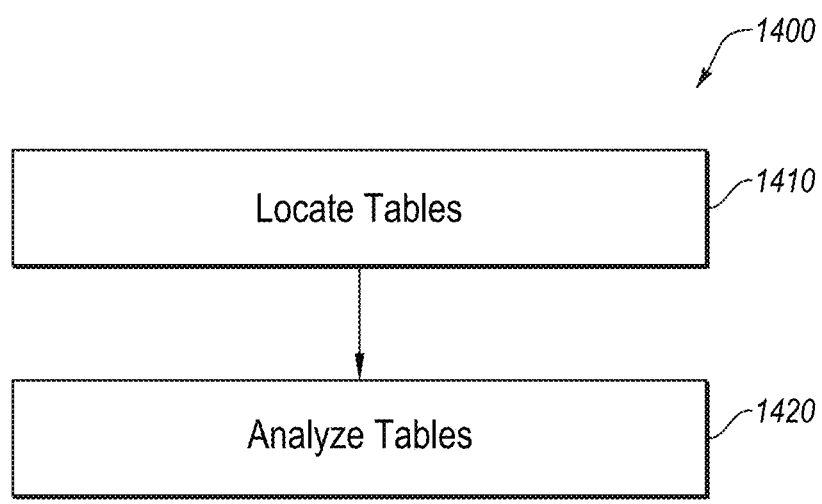
FIG. 14 depicts a flowchart illustrating a method for performing an analysis of tables located within the online content according to one embodiment.

FIG. 14 depicts a diagram of an example flow 1400 that may be used for performing an analysis of tables located within the content 125a-125d, according to at least one embodiment described herein, and which may comprise at least a portion of block 420 in FIG. 4. In some embodiments, flow 1400 may be configured to illustrate a process to analyze the non-linguistic content captured in a table within a piece of content 125a received from an information source 120 in order to assess the difficulty level of the content 125a, and may be an example of the operation of system 100 of FIG. 1.

The flow 1400 may begin at block 1410, where the content 125a is parsed to locate any tables contained therein. Various tools may be used in this process, including parsing web pages using an OCR program, identifying table tags, or the like and parsing .pdf Adobe® files using Tabula®. Once the data is extracted at block 1410, at block 1420, the table is analyzed to generate an estimation of its complexity. In one example, the tables 1505 and 1510 shown in FIG. 15 may be considered of small complexity because they contain relatively few cells, columns, and rows. In contrast, able 1515 may be determined to be more complex based on the number of cells, the arrangement of the cells in to sub-classifications.

Figure 16:
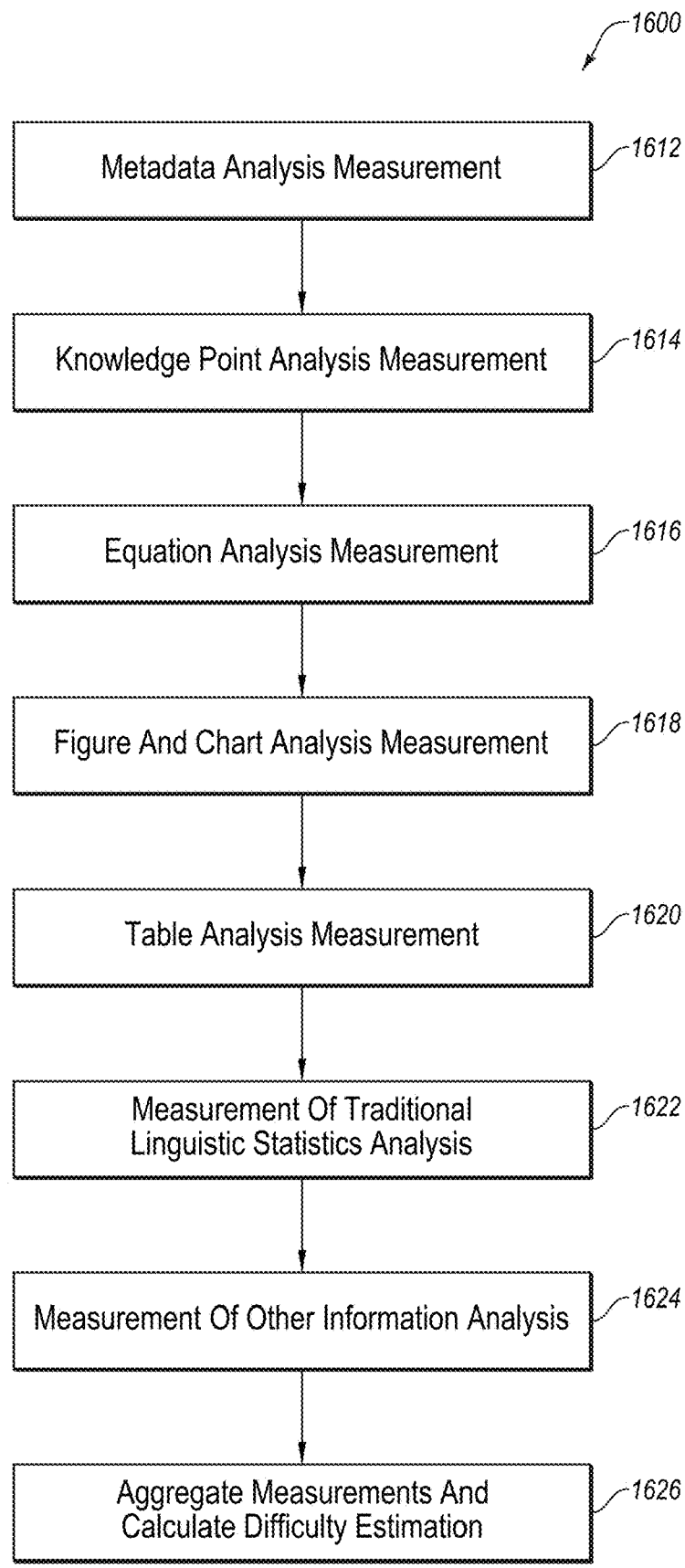
FIG. 16 depicts a flowchart illustrating a method for generating a difficulty estimation of the online content according to one embodiment.

FIG. 16 depicts a diagram of an example flow 1600 that may be used for generating a difficulty estimation of the content 125a-125d, according to at least one embodiment described herein. In some embodiments, flow 1600 may be configured to aggregate all the analysis performed with respect to the fetched content 125a-125d from a variety of information sources 120 in order to assess a difficulty level of the content 125a-125d. In these and other embodiments, a portion of flow 1600 may be an example of the operation of system 100 of FIG. 1. Further, although flow 1600 is described as being performed on a single piece of content 125a, it should be understood that the flow 1600 may be performed for multiple pieces of content 125a-125b or a subset of any of the available content 125a-125d identified by the estimation system 110.

Flow 1600 may begin at block 1612, with wherein the analysis of the metadata associated with a piece of content 125a is measured and quantified as a one-hot vector or other value. At block 1614, a value or series of values corresponding to knowledge point analysis performed on a piece of content 125a may be retrieved. In some instances the measurement may be an average score corresponding to a metric of all the knowledge points identified in a piece of content 125a. In other instances, the value may be stored as a one-hot vector.

For example, in one embodiment, a measurement for each knowledge point may be performed based on both concept breath and learning path. These measurements may be stored as, for example, the following:

Tf–idf(a*breadth_score+b*depth_score), where a+b=1, Tf–idf is a numerical statistic that is intended to reflect how important a word is to a document in a collection or corpus, breadth_score is a measurement of the breadth of the information associated with a knowledge point and depth_score is a measurement of the depth of the knowledge point.

At block 1616, a value or series of values corresponding to the analysis of the equations contained in a piece of content 125a is retrieved. In one embodiment, this may be a score or value corresponding to a number of equations, average size of equations (including the number of steps in a single equation), and an average complexity of the equations contained within the content 125a. As was previously described, values may be assigned to a single equation in order to estimate the complexity of each equation.

At block 1618, a score corresponding to the analysis performed on the content 125a to identify any figures or charts is obtained. In some instances, this score may reflect the number of connections (i.e. arrows/lines) in a system structure. In other instances, the value may correspond to a visualization of experiment results, by analyzing the number of figures or calculating a value corresponding to an average complexity of each figure or chart in the content 125a. The overall score may be either a single value or may be a vector.

At block 1620 a score corresponding to the analysis performed on the content 125a to identify any tables contained therein is obtained. In some instances, this score may reflect the number tables, the average number of cells contained in each tables, an average score of the complexity of each table, as reflected by their overall structure and size. This score may be either a single value or may be a vector.

At block 1622, a score corresponding to the complexity of the language of the content 125a is obtained according to the results of the linguistic analysis. As was described above this value may be a single score or a vector. At block 1624, a score corresponding to the complexity of the analysis of the language of the content 125a is obtained. As was described above this value may be a single score or a vector.

At block 1624, a score corresponding to any other information associated with the content 125a for which an analysis was also performed is obtained. Examples of such information was described above with respect to block 424.

At block 1626, an aggregate score is generated based on all the scores obtained in blocks 1612-1624. In some instances, the aggregate score may comprise a unified vector. In some instances the aggregate score may be generated by weighting some of the scores obtained in blocks 1612-1624 differing amounts by assigning ad hoc weight parameters of linear combinations of all the features captured in the unified vector. In other instances, the system 100 may perform machine learning to calculate the difficulty estimation scores. The system 100 may continue the machine learning process as it receives feedback from users of the system 100. Such machine learning may include regression for continuous scoring or continuous reclassification (using for example linear regression or xgboost). It should be understood that some of the scores from blocks 1612-1624 may be omitted if, for example, there are no corresponding elements in the content 125*a*. For example, no score will be retrieved or generated at block 1618 if no figures or charts are included in the content 125*a*.

Returning now to FIG. 1, in one embodiment, the ability to generate and aggregate score corresponding to an estimated difficulty of the content 125*a*-125*d* may then be used to perform a personalized recommendation system for the user 102. More particularly, a user of the system 100 may request content 125*a*-125*d* which has been filtered and ranked by the estimation system 110 according to his or her technical understanding. In some instances, this may be performed by the user 102 manually selecting their own expected difficulty level, such as the user 102 using a user interface of the learner module 132. For example, the user 102 may indicate that they would like "beginner," "intermediate," or "advanced" level content. Using this selection in association with the aggregate scoring of the content 125*a*-125*d* generated as described above, the estimation system 110 may then recommend content 125*a* which matches the desired difficulty level.

In other embodiments, the learner module 132 may automatically determine the level of understanding of the user 102 based on a user profile 133. In some instances, the user profile 133 may include an evaluation based on the reading history, prior searches, or other feedback so as to estimate a skill level of the user. In some instances, the learner module 132 may then recommend content 125*a*-125*d* which has a similar difficulty level or aggregate score as previous content read by the user 102 or content 125*a*-125*d* which has a slightly higher aggregate score in order to challenge the user 102.

As such, the systems and methods described herein provide an improved system for estimating and evaluating the difficulty or complexity of various types of content, particularly technical content. In some instances, this estimation may then be used to provide a better means of recommending content to learners.

Figure 17:
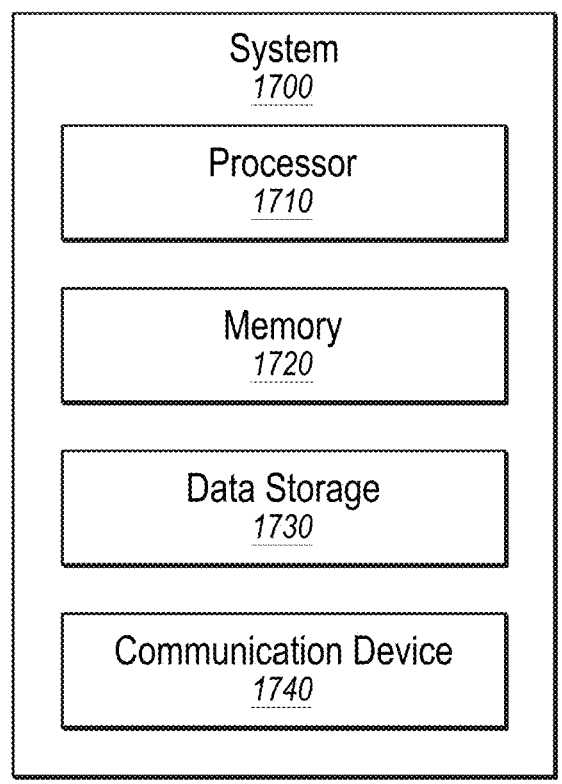
FIG. 17 illustrates an example system capable of performing the methods described herein.

FIG. 17 illustrates an example system 1700, according to at least one embodiment described herein. System 1700 may include any suitable system, apparatus, or device configured to test software. System 1700 may include a processor 1710, a memory 1720, a data storage 1730, and a communication device 1740, which all may be communicatively coupled. Data storage 1730 may include various types of data, such as author objects and social media account objects.

Generally, processor 1710 may include any suitable special-purpose or general-purpose computer, computing entity, or processing device including various computer hardware or software modules and may be configured to execute instructions stored on any applicable computer-readable storage media. For example, processor 1710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 17, it is understood that processor 1710 may include any number of processors distributed across any number of network or physical locations that are configured to perform individually or collectively any number of operations described herein. In some embodiments, processor 1710 may interpret and/or execute program instructions and/or process data stored in memory 1720, data storage 1730, or memory 1720 and data storage 1730. In some embodiments, processor 1710 may fetch program instructions from data storage 1730 and load the program instructions into memory 1720.

After the program instructions are loaded into memory 1720, processor 1710 may execute the program instructions, such as instructions to perform flow 200, flow 400, flow 500, flow 800, flow 1100, flow 1300, flow 1600 method 200, method 400, method 500, method 800, method 1100, method 1300, and/or method 1600 as described herein. For example, processor 1710 may retrieve or receive content and may parse the content to identify both linguistic and non-linguistic elements within the content to generate an estimated difficulty level of the content. Processor 1710 may then filter or recommend content to a user communicating with the processor 1710 based on the estimated difficulty level.

Memory 1720 and data storage 1730 may include computer-readable storage media or one or more computer-readable storage mediums for carrying or having computer-executable instructions or data structures stored thereon. Such computer-readable storage media may be any available media that may be accessed by a general-purpose or special-purpose computer, such as processor 1710.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 1710 to perform a certain operation or group of operations.

Communication unit 1740 may include any component, device, system, or combination thereof that is configured to transmit or receive information over a network. In some embodiments, communication unit 1740 may communicate with other devices at other locations, the same location, or even other components within the same system. For example, communication unit 1740 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 1740 may permit data to be exchanged with a network and/or any other devices or systems described in the present disclosure. For example, the communication unit 1740 may allow system 1700 to communicate with other systems, such information sources 120 and device 130 of FIG. 1.

Modifications, additions, or omissions may be made to system 1700 without departing from the scope of the present disclosure. For example, the data storage 1730 may be multiple different storage mediums located in multiple locations and accessed by processor 1710 through a network.

As indicated above, the embodiments described herein may include the use of a special purpose or general purpose computer (e.g., processor 1710 of FIG. 17) including various computer hardware or software modules, as discussed in greater detail below. Further, as indicated above, embodiments described herein may be implemented using computer-readable media (e.g., memory 1720 or data storage 1730 of FIG. 17) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of automatically estimating the difficulty level of online content, the method comprises:
receiving, by one or more processors, electronic content which is accessible via an online network and which is at least temporarily stored in at least one non-transitory storage medium;
extracting, by the one or more processors, structural and non-linguistic information from the electronic content;
extracting, by the one or more processors, linguistic information from the electronic content;
extracting, by the one or more processors, knowledge points from the linguistic information of the electronic content;
performing, by the one or more processors, a knowledge point analysis on the extracted knowledge points, the knowledge point analysis including performing one or more of:
determining a measure of breadth of the knowledge points; or
determining dependency relationships between the knowledge points;
generating, by the one or more processors, an overall difficulty estimation for the content based on the knowledge point analysis, the structural and non-linguistic information, and the linguistic information; and
generating, by the one or more processors, a recommendation of a subset of the electronic content to a user based on the overall difficulty estimation.

2. The method of claim 1, wherein the electronic content comprises a journal article, a white paper, a thesis, research paper, or scientific paper.

3. The method of claim 1, wherein the structural and non-linguistic information comprises metadata associated with the electronic content.

4. The method of claim 1, wherein the structural and non-linguistic information comprises at least one figure or chart within the electronic content and wherein the overall difficulty estimation is based on a determination of the complexity of the at least one figure or chart.

5. The method of claim 1, wherein the structural and non-linguistic information comprises at least one equation embedded within the electronic content and wherein the overall difficulty estimation is based on a determination of the complexity of the at least one equation.

6. The method of claim 1, wherein the structural and non-linguistic information comprises at least one chart embedded within the electronic content and wherein the overall difficulty estimation is based on a determination of the complexity of the at least one chart.

7. The method of claim 1, wherein extracting structural and non-linguistic information from the electronic content comprises:
extracting, by the one or more processors, metadata associated with the electronic content;
extracting, by the one or more processors, tables associated with the electronic content;
extracting, by the one or more processors, mathematical equations or chemical formulae associated with the electronic content;
extracting, by the one or more processors, charts or graphs associated with the electronic content;
generating, by the one or more processors, a difficulty estimation of the metadata associated with the electronic content;
generating, by the one or more processors, a difficulty estimation of the tables associated with the electronic content;
generating, by the one or more processors, a difficulty estimation of the mathematical equations or chemical formulae associated with the electronic content;
generating, by the one or more processors, a difficulty estimation of the charts or graphs associated with the electronic content;
generating, by the one or more processors, a difficulty estimation of the linguistic information of the electronic content; and
generating, by the one or more processors, a difficulty estimation of the knowledge points based on the knowledge point analysis,
wherein the overall difficulty estimation for the content is based on an aggregate score corresponding to the estimation of the difficulty of the linguistic information of the electronic content, the estimation of the difficulty of the knowledge points, the difficulty estimation of the metadata, the difficulty estimation of the tables associated with the electronic content, the difficulty estimation of the mathematical equations or chemical formulae of the electronic content, the difficulty estimation of the of the charts or graphs associated with the electronic content.

8. The method of claim 7, further comprising:
assigning weights to each of the estimation of the difficulty of the linguistic information of the electronic content, the estimation of the difficulty of the knowledge points, the difficulty estimation of the metadata, the difficulty estimation of the tables associated with the electronic content, the difficulty estimation of the mathematical equations or chemical formulae of the electronic content, the difficulty estimation of the of the charts or graphs associated with the electronic content.

9. The method of claim 1, further comprising:
presenting the subset of the electronic content to the user based on the overall difficulty estimation.

10. The method of claim 1, further comprising:
receiving a selection from a user interface of a desired difficulty of content,
wherein the subset of the electronic content recommended to the user corresponds to the desired difficulty level.

11. At least one non-transitory computer-readable medium having encoded therein programming code executable by one or more processors to perform or control performance of operations comprising:
receiving electronic content which is accessible via an online network and which is at least temporarily stored in non-transitory storage media;
extracting structural and non-linguistic information from the electronic content;
extracting linguistic information from the electronic content;
extracting knowledge points from the linguistic information of the electronic content;
performing a knowledge point analysis on the extracted knowledge points, the knowledge point analysis including performing one or more of:
determining a measure of breadth of the knowledge points; or
determining dependency relationships between the knowledge points;
generating an overall difficulty estimation for the content based on the knowledge point analysis, the structural and non-linguistic information, and the linguistic information; and
generating a recommendation of a subset of the electronic content to a user based on the difficulty estimation.

12. The non-transitory computer-readable medium of claim 11, wherein the structural and non-linguistic information comprises metadata associated with the electronic content.

13. The non-transitory computer-readable medium of claim 11, wherein the structural and non-linguistic information comprises at least one figure or chart within the electronic content and wherein the overall difficulty estimation is based on a determination of the complexity of the at least one figure or chart.

14. The non-transitory computer-readable medium of claim 11, wherein the structural and non-linguistic information comprises at least one equation embedded within the electronic content and wherein the overall difficulty estimation is based on a determination of the complexity of the at least one equation.

15. The non-transitory computer-readable medium of claim 11, wherein the structural and non-linguistic information comprises at least one chart embedded within the electronic content and wherein the overall difficulty estimation is based on a determination of the complexity of the at least one chart.

16. The non-transitory computer-readable medium of claim 11, wherein extracting structural and non-linguistic information from the electronic content comprises:
extracting metadata associated with the electronic content;
extracting tables associated with the electronic content;
extracting mathematical equations or chemical formulae associated with the electronic content;
extracting charts or graphs associated with the electronic content;
generating a difficulty estimation of the metadata associated with the electronic content;
generating a difficulty estimation of the tables associated with the electronic content;
generating a difficulty estimation of the mathematical equations or chemical formulae associated with the electronic content;
generating a difficulty estimation of the charts or graphs associated with the electronic content;
generating a difficulty estimation of the linguistic information of the electronic content; and generating a difficulty estimation of the knowledge points based on the knowledge point analysis, wherein the overall difficulty estimation for the content is based on an aggregate score corresponding to the estimation of the difficulty of the linguistic information of the electronic content, the estimation of the difficulty of the knowledge points, the difficulty estimation of the metadata, the difficulty estimation of the tables associated with the electronic content, the difficulty estimation of the mathematical equations or chemical formulae of the electronic content, the difficulty estimation of the of the charts or graphs associated with the electronic content.

17. The non-transitory computer-readable medium of claim 16, wherein extracting structural and non-linguistic information from the electronic content comprises:

assigning weights to each of the estimation of the difficulty of the linguistic information of the electronic content, the estimation of the difficulty of the knowledge points, the difficulty estimation of the metadata, the difficulty estimation of the tables associated with the electronic content, the difficulty estimation of the mathematical equations or chemical formulae of the electronic content, the difficulty estimation of the of the charts or graphs associated with the electronic content.

18. A system of automatically estimating the difficulty level of online content, the system comprising:

one or more processors; and one or more computer-readable storage media configured to store instructions that, in response to being executed by the one or more processors, cause the system to perform operations, the operations comprising:

receive electronic content which is accessible via an online network and which is at least temporarily stored in at least one non-transitory storage medium;

extract structural and non-linguistic information from the electronic content;

extract linguistic information from the electronic content;

extract knowledge points from the linguistic information of the electronic content;

perform a knowledge point analysis on the extracted knowledge points, the knowledge point analysis including performing one or more of:

determining a measure of breadth of the knowledge points; or determining dependency relationships between the knowledge points;

generate an overall difficulty estimation for the content based on the knowledge point analysis, the structural and non-linguistic information, and the linguistic information; and generate a recommendation of a subset of the electronic content to a user based on the difficulty estimation.

* * * * *